United States Patent [19]

Tunnicliffe et al.

[11] Patent Number: 5,505,392
[45] Date of Patent: Apr. 9, 1996

[54] MILL HAVING A ROTARY DRIVE COUPLING

[75] Inventors: George Tunnicliffe, Stoke-on-Trent; John P. Lee, Prestbury, both of England; Damian Dixon, Wigan, United Kingdom

[73] Assignee: Kemutec Group, Ltd., Macclesfield, United Kingdom

[21] Appl. No.: 148,721

[22] Filed: Nov. 8, 1993

[51] Int. Cl.⁶ .................................................. B02C 19/08
[52] U.S. Cl. ........................ 241/74; 241/86; 241/199.12
[58] Field of Search ................................ 241/73, 74, 86, 241/199.12

[56] References Cited

U.S. PATENT DOCUMENTS

| | | | |
|---|---|---|---|
| 4,605,173 | 8/1986 | Edmonds | 241/74 X |
| 4,773,599 | 9/1988 | Lynch et al. | 241/74 X |
| 5,282,579 | 2/1994 | Poser et al. | 241/74 X |
| 5,330,113 | 7/1994 | Poser et al. | 241/74 |

Primary Examiner—Timothy V. Eley
Attorney, Agent, or Firm—Daniel De Joseph

[57] ABSTRACT

An adjustable length rotary drive coupling comprising a first rotary shaft provided with at least one tooth and a second rotary shaft provided with a plurality of abutment surfaces spaced apart along the length thereof associated with each the tooth. One of the rotary shafts is a drive shaft, with the other shaft being a driven shaft. Each tooth is selectively engageable with any of its associated abutment surfaces, to enable the length of the rotary drive coupling to be adjusted.

3 Claims, 2 Drawing Sheets

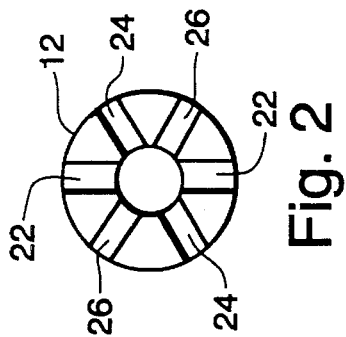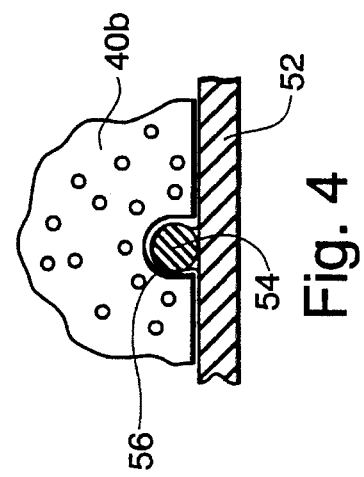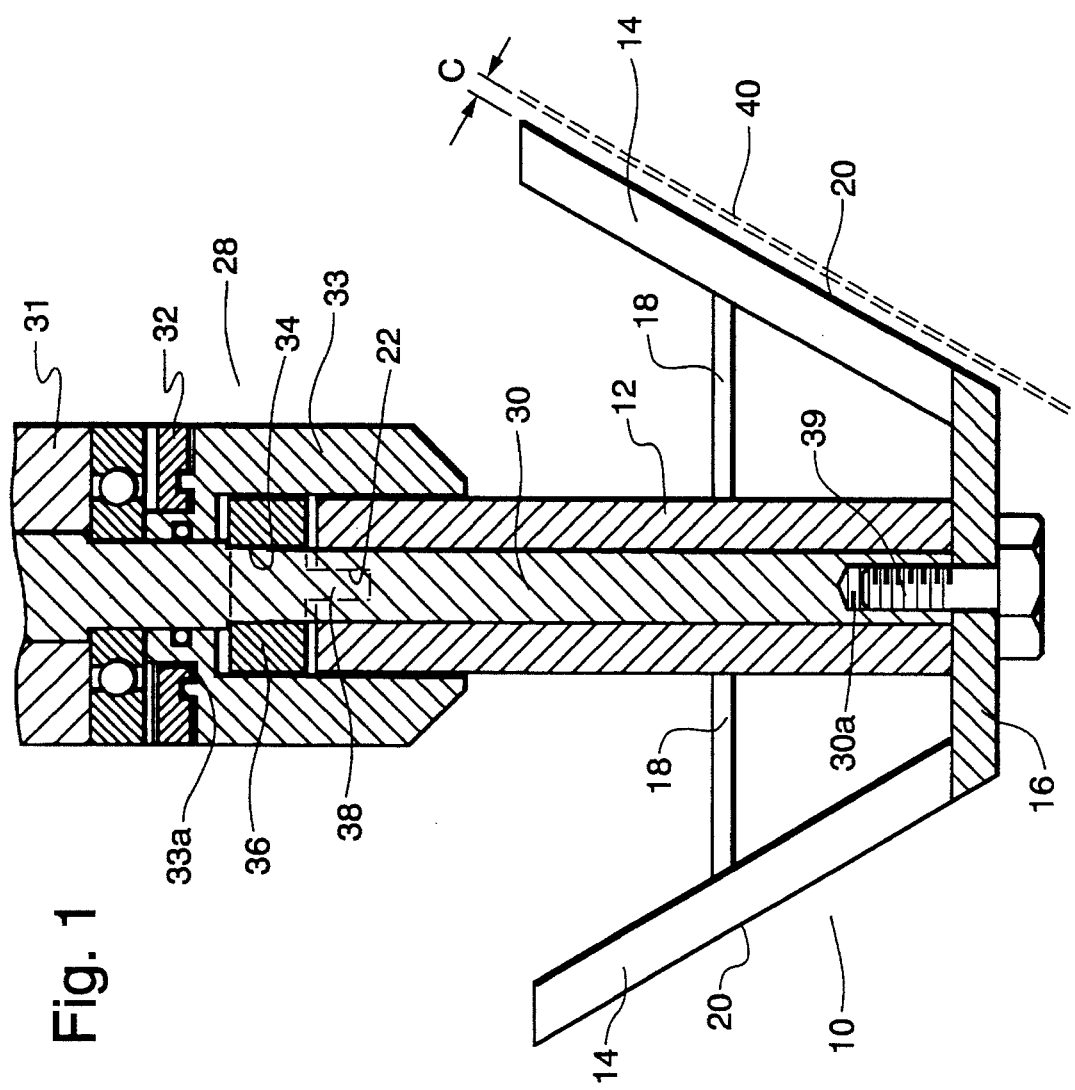

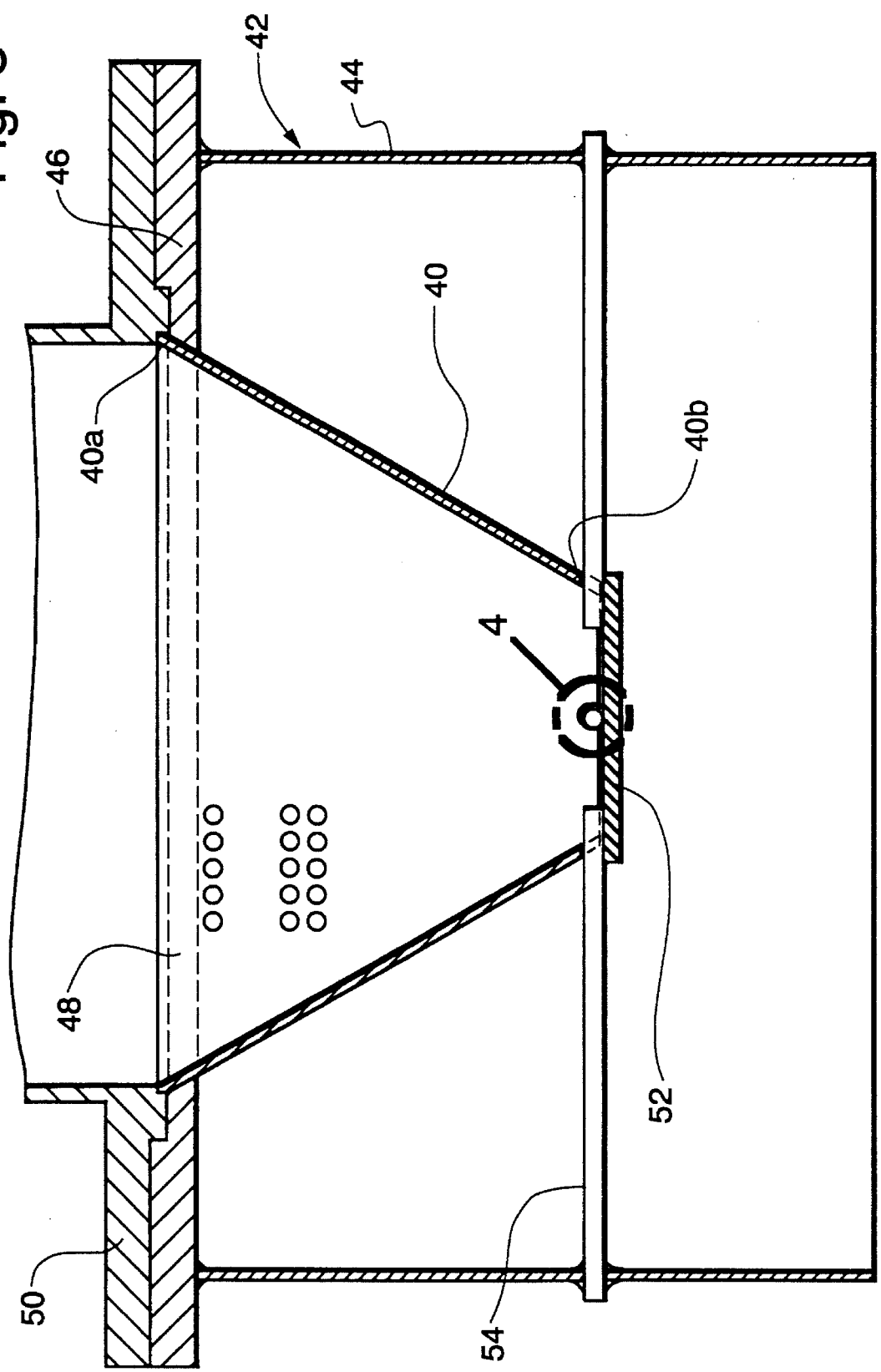

MILL HAVING A ROTARY DRIVE COUPLING

BACKGROUND OF THE INVENTION

This invention relates to a mill, and particularly but not exclusively to a cone mill for use in milling a product, the product being milled between a rotating beater and the wall of a perforated screen.

Cone mills generally comprise a conical, or truncated conical, perforated screen within which the product to be milled is located, and a rotor including at least one milling member mounted upon a rotor shaft which extends coaxially with the screen, the rotor shaft being supported by suitable means, such as a bearing housing, and being arranged to be rotated about the axis of the screen by a motor.

In order to produce the desired milled product, it is desirable to be able to adjust the spacing of each milling member from the inner wall of the screen. In known cone mills, the spacing may be adjusted by using a different rotor of different length rotor shaft, and thus either lowering or raising each milling member within the screen. Another known method is to fit one or more shims between the rotor shaft and a drive shaft via which the motor rotates the rotor shaft. Both of these methods have the disadvantage that a number of spare parts must be bought and stored, either in the form of different size rotors or shims, and that these parts may become lost, or in the case of using shims, may become loose and fall out during operation of the cone mill.

It is an object of the invention to obviate or mitigate the problems associated with such a cone mill.

According to a first aspect of the invention there is provided an adjustable length rotary drive coupling comprising a first rotary shaft provided with at least one tooth and a second rotary shaft provided with a plurality of abutment surfaces spaced apart along the length thereof associated with each tooth, one of said first and second rotary shafts being a drive shaft and the other being a driven shaft, each tooth being selectively engageable with any of its associated abutment surfaces, to enable the length of the rotary drive coupling to be adjusted.

Preferably, the second rotary shaft includes a plurality of recesses of different depths extending longitudinally of the second rotary shaft from a surface thereof facing the first rotary shaft, the base of each of the recesses defining a respective one of the abutment surfaces, with each tooth projecting towards the second rotary shaft from a surface of the first rotary shaft which faces said surface of the second rotary shaft, with each tooth being longer than at least one of its associated recesses in order to be engageable with at least one of its associated abutment surfaces.

It will be understood that, in use, the length of the rotary drive coupling is adjustable by disengaging each tooth from the selected recess or recesses, and engaging each tooth with a different one its associated recesses. Clearly, the length of the coupling is adjustable without substituting or introducing spare parts into it.

The first shaft preferably includes two teeth which preferably extend radially of the axis of the first shaft.

The second shaft preferably includes three pairs of diametrically opposed equi-angularly spaced recesses of different depths. The recesses are preferably provided in an end face of the second shaft.

According to a second aspect of the invention there is provided a mill comprising a screen and a rotor arranged to be supported and rotated within the screen by a motor, in combination with a rotary drive coupling as defined in any of the last preceding five paragraphs, wherein the drive shaft is connected to the motor directly or indirectly and the driven shaft forms part of the rotor which also includes at least one milling member, whereby the spacing of each milling member from the screen is adjustable.

Preferably, the recesses are formed in the driven shaft and the teeth are provided on the drive shaft.

The driven shaft is preferably hollow, the drive shaft extending within the driven shaft, the drive shaft preferably including an internally screw threaded bore in its end remote from the teeth and recesses, the rotor being arranged to be secured to the drive shaft by a bolt extending through part of the rotor and engaging in the screw threaded bore.

The teeth preferably form part of a drive dog provided part way along the length of the drive shaft, the drive dog being rotatable with the drive shaft, but being prevented from performing axial movement along the drive shaft.

The screen used in conventional cone mills is normally formed from a strip of perforated material which is shaped so as to take on the form of a truncated cone, the edges of the strip being welded together, or attached to one another by an alternative known technique. The end of the screen of largest diameter is provided with an outwardly extending annular flange in order to strengthen the screen, and also to facilitate attachment of the screen to the remainder of the cone mill. The flange is generally either welded to the remainder of the screen or is formed by flaring out the end of the cone. The provision of the flange increases the cost of the screen, and often leads to hygiene problems with the cone mill.

Another known form of screen comprises a truncated cone formed of a folded and welded sheet of perforated material, the smaller diameter end of the screen being closed by an end wall welded to the screen. The screen does not include a flange at its upper end. Such a screen is supported within the cone mill by a suitably shaped cradle. In order to prevent rotation of the screen in use, a portion of a weld seam on the screen is enlarged and is arranged to sit within a recess provided in the wall of the cradle. Such an arrangement has a limited resistance to rotation in service. Also, the provision of a welded end wall at the lower end of the screen adds to the cost and complexity of manufacture of the screen.

It is an object of the third aspect of the present invention to provide a mill in which the above problems can be reduced.

According to said third aspect of the invention, there is provided a mill comprising an open bottomed screen, a rotor having at least one milling member arranged to rotate within the screen, the screen being carried by a support including an inwardly extending flange defining an aperture of diameter smaller than the upper, large diameter end of the screen, a closure member arranged to close the lower end of the screen, means for preventing the screen from rotating relative to the support, and means for clamping the upper end of the screen against the flange.

Preferably, the closure member is biassed against the lower end of the screen, the closure member preferably being supported by a plurality of arms extending from the support. The arms are preferably resilient or are resiliently mounted on the support.

The arms preferably extend onto the upper surface of the closure member, so as to engage in recesses formed in the lower end of the screen.

The clamping means is preferably arranged in such a manner as to clamp the upper end of the screen against the flange of the support, the action of clamping the screen against the flange resulting in the screen being pushed downwards against the closure member, the arms biasing the closure member against the lower end of the screen.

Whilst the present invention, in all of its above-identified aspects, is particularly applicable to cone mills, i.e. mills having a screen lying on a conical surface, it is applicable also to mills, beaters and mixers generally where there is relative movement between at least one beating, mixing or milling element and a cooperating surface, e.g. a screen or even a non-perforated surface which may be of cylindrical or any other appropriate form.

DESCRIPTION OF THE DRAWINGS

The invention will further be described by way of example with reference to the accompanying drawings, in which:

FIG. 1 is an axial section through part of a cone mill including an adjustable length rotary drive coupling;

FIG. 2 is a plan view of part of the rotary drive coupling of the cone mill of FIG. 1;

FIG. 3 is a sectional view of the cone support mechanism of the cone mill; and

FIG. 4 is an enlarged view of part of FIG. 3.

DETAILED DESCRIPTION OF THE INVENTION

The cone mill illustrated in the accompanying drawings comprises a perforated truncated conical screen 40 within which a rotor 10 is mounted for rotation about the axis of the screen 40. As shown in FIGS. 1 and 2, the rotor 10 comprises a hollow shaft 12 which is arranged to extend along the axis of the screen 40, a base 16 attached to the lower end of the shaft 12, and a plurality of milling members 14 supported by the base 16. Each of the milling members 14 comprises a blade 20 inclined to the axis of the shaft 12 at an angle of inclination equal to the inclination of the wall of the screen 40 with respect to its axis. In this embodiment, each of the milling members 14 is also supported by a rib 18 which extends radially from the shaft 12 and is attached to the milling member 14 at a position approximately half way along its length. However, each of the milling members 14 may be supported at other convenient locations as desired.

The rotor 10 is supported for rotational movement about the axis of the screen 40 by a vertical drive shaft 30 (only partly shown) driven by a motor (not shown) via a belt and pulleys (also not shown). Alternatively, the motor may be directly connected to the drive shaft 30. The drive shaft 30 is rotatably supported in a fixed bearing housing 31 but is fixed against axial movement relative to the latter. The bearing housing 31 has a housing labyrinth seal member 32 secured to its lower end. A collar 33 rotatable with the drive shaft 30 has a labyrinth formation 33a therein which cooperates with the labyrinth seal member 32. The drive shaft 30 extends within the hollow shaft 12 of the rotor 10, generally coaxially with the screen 40.

The drive shaft 30 and the hollow shaft 12 form the drive shaft and driven shaft of an adjustable length rotary drive coupling 28. An annular drive dog 36 is provided on the drive shaft 30 within the collar 33. The drive dog 36 is secured to the collar 33, e.g. by means of bolts (not shown) and includes a pair of radially extending teeth 38 projecting towards the shaft 12 of the rotor 10, each of the teeth 38 being arranged to engage with a respective one of a plurality of slots 22, 24, 26 provided in the upper end face of the shaft 12 of the rotor 10. The drive shaft 30 and the drive dog 36 are shaped so as to prevent relative rotation of the drive shaft 30 and the drive dog 36. The drive shaft 30 includes flats 34 which are arranged to engage with corresponding flats on the inner peripheral wall of the annular drive dog 36.

The rotor 10 is secured in position on the drive shaft 30 by a bolt 39 which extends through the base 16 of the rotor 10, and into a screw threaded bore 30a provided in the lower end of the drive shaft 30. It will be understood that, when the rotor 10 is secured to the drive shaft 30, the drive dog 36 is clamped between the drive shaft 30 and the shaft 12 of the rotor 10, and movement of the drive dog 36 along the drive shaft 30 is prevented.

The slots 22, 24, 26 are arranged as three pairs which are of different depths such that the position of the rotor 10 along the axis of the screen may be adjusted by arranging the teeth 38 of the drive dog 36 to engage with respective ones of a selected pair of the slots 22, 24, 26. In the embodiment shown in the drawings, the shaft 12 is provided with three pairs of equi-angularly spaced slots 22, 24, 26, extending radially of the axis of the shaft 12. The slots comprising each pair are diametrically opposed with respect to the axis of the shaft 12.

It will be understood that by adjusting the position of the rotor 10 along the axis of the screen 40, the size of the gap 'c' between the rotor 10 and the screen 40 may be adjusted, and that the position of the rotor 10 along the axis of the screen 40 is adjustable by adjusting the relative angular positions of the drive shaft 30 and the rotor shaft 12.

In use, when it is desired to adjust the size of the gap 'c' between the milling members 14 and the screen 40, the bolt 39 is removed and the rotor 10 lowered until the teeth 38 of the drive dog 36 become disengaged from the pair of slots 22, 24, 26 with which they had been engaged. The rotor 10 is then rotated with respect to the drive shaft 30 and re-engaged with the drive dog 36 by raising the rotor 10, the teeth 38 of the drive dog 36 engaging with a different pair of the slots 22, 24, 26. Once the desired position of the rotor 10 has been selected, the bolt 39 is reintroduced into the screw threaded bore 30a, and is tightened.

In this embodiment, the conical screen 40 is constructed from perforated sheet material, the material being formed into the desired truncated conical shape, and the edges of the material are joined together by welding. However, it is possible to form the screen by fabricating it from strips or by casting it if desired. The screen 40 itself is not rigid, and so requires the use of a support in order to retain a circular cross section. It will be understood that unless the screen 40 retains a circular cross section, the gap 'c' between the screen 40 and the milling members 14 will not remain uniform during use of the cone mill, resulting in the mill operating inefficiently.

In order to retain a circular cross section, the screen 40 is supported by the upper end of a discharge chute assembly 42. The discharge chute assembly 42 takes the form of a cylindrical tube 44 which surrounds the screen 40, and an inwardly extending flange 46 provided at the upper end of the tube 44 arranged to engage the upper end 40a of the screen 40. The flange 46 defines an aperture 48 of diameter slightly smaller than the diameter of the upper end 40a of the screen 40 such that the screen 40 cannot pass completely through the aperture 48. The inner edge of the flange 46 which defines the aperture 48 is angled to the vertical so as to conform with the inclination of the wall of the screen 40. The discharge chute assembly 42 is arranged such that, in use, it is clamped to the lower end of a housing 50 containing the motor. The action of clamping the discharge chute assembly 42 to the housing 50 causes the upper end 40*a* of the screen 40 to abut the housing 50, the screen 40 being forced downwards against the flange 46 resulting in the screen 40 being clamped tightly against the flange 46. It will be understood that when the screen 40 is tightly clamped against the flange 46, the rigidity of the screen 40 is improved such that, in use, the screen 40 will tend to keep its circular cross section.

A closure plate 52 is supported within the discharge chute assembly 42 by a plurality of resilient arms 54 which extend from the wall of the cylindrical tube 44 to the closure plate 52. The closure plate 52 comprises a generally circular disc of diameter larger than the diameter of the lower end 40*b* of the screen 40. The closure plate 52 is supported in a position in which when the screen 40 is clamped against the flange 46, the downward movement of the screen 40 results in the closure plate 52 being forced downwards from its rest position so as to close the lower end 40*b* of the screen 40 and prevent the escape of unmilled product from the lower end 40*b* of the screen 40, the closure plate 52 being biassed against the lower end 40*b* of the screen 40.

As shown in FIG. 4, the resilient arms 54 extend onto the upper surface of the closure member 52, the lower end 40*b* of the screen 40 including a plurality of recesses 56 positioned so as to allow the resilient arms 54 to extend therethrough. In use, the rotation of the rotor 10 tends to cause the screen 40 to rotate, rotation of the screen 40 resulting in reduced efficiency of the milling process. Rotation of the screen 40 is prevented by the resilient arms 54 extending through the recesses 56 provided in the lower end 40*b* of the screen 40.

It will be understood that a number of modifications may be made to the above described cone mill, for example, the teeth may be provided directly on the drive shaft of the mill rather than on a drive dog which is carried by the drive shaft. The invention is not limited to the case where the adjustable length drive coupling includes two teeth and three pairs of slots, couplings including different numbers of teeth and slots being practical alternatives to that described above.

In a modification to the above described cone mill, the adjustable length rotary drive coupling may be arranged such that the drive shaft of the mill is provided with the slots, the rotor shaft including at least one tooth, with each tooth being arranged to engage with a selected one of the slots. As a further alternative, a hole and dowel arrangement may be provided. As a still further alternative, mating serrations or steps may be provided on the respective parts. Further, the rotor need not be attached to the drive shaft by a bolt, for example, the drive shaft may include a downwardly extending screw threaded spigot arranged to extend through an aperture provided in the base of the rotor, the mill further including a nut arranged to engage with the screw threaded spigot in order to secure the rotor to the drive shaft.

Additionally, the above-described arrangement of recesses 56 in the lower end 40*b* of the screen 40 may be replaced. For instance, protrusions may be provided in either the upper housing 50 or in the flange 46 at the upper end of the tube 44. Such protrusions could then be arranged to engage slots, holes or recesses in the larger upper end 40*a* of the screen 40. In such a case, the smaller lower end 40*b* of the screen and the upper face of the closure plate 52 can then be left plain.

We claim:

1. A mill comprising a screen and a rotor arranged to be supported and rotated within the screen by a motor, in combination with an adjustable length rotary drive coupling, said coupling comprising a first rotary shaft provided with at least one tooth and a second rotary shaft provided with a plurality of recesses spaced apart along the length thereof, each said recess being engageable with each of said at least one tooth, one of said first and second rotary shafts being a drive shaft and the other being a driven shaft, with each tooth being selectively engageable with any one of said plurality of recesses, to enable the length of the rotary drive coupling to be adjusted, wherein the drive shaft is connected to the motor directly or indirectly and the driven shaft forms part of the rotor which also includes at least one milling member, whereby the spacing of said milling member from the screen is adjustable.

2. A mill as claimed in claim 1, wherein the recesses are formed in the driven shaft and the teeth are provided on the drive shaft.

3. A mill as claimed in claim 1, wherein the driven shaft is hollow, the drive shaft extends within the driven shaft, the drive shaft includes an internally screw threaded bore in its end remote from the teeth and recesses, and the rotor is arranged to be secured to the drive shaft by a bolt extending through part of the rotor and engaging in the screw threaded bore.

* * * * *